(12) United States Patent
Rocheleau

(10) Patent No.: US 6,935,361 B2
(45) Date of Patent: Aug. 30, 2005

(54) PIPE, PIPING SYSTEM, RADIANT HEATING SYSTEM, AND KIT

(76) Inventor: John W. Rocheleau, 69 South Rd., Brentwood, NH (US) 03833

( * ) Notice: Subject to any disclaimer, the term of this patent is extended or adjusted under 35 U.S.C. 154(b) by 126 days.

(21) Appl. No.: 10/335,479

(22) Filed: Dec. 31, 2002

(65) Prior Publication Data
US 2004/0123913 A1 Jul. 1, 2004

(51) Int. Cl.⁷ ............ F16K 49/00; F16K 11/00; F16L 11/00
(52) U.S. Cl. ............ 137/340; 137/315.01; 137/335; 137/559; 137/565.01; 138/110; 237/9 A; 251/368
(58) Field of Search ............ 137/340, 334, 137/315.07, 335, 559, 565.07; 251/368; 138/110; 237/9 A (56) References Cited

U.S. PATENT DOCUMENTS

| | | | | |
|---|---|---|---|---|
| 2,781,174 A | * | 2/1957 | Smith | 237/8 C |
| 3,873,022 A | * | 3/1975 | Hilgemann | 237/8 R |
| 4,679,729 A | * | 7/1987 | Petitjean et al. | 237/8 R |
| 4,750,472 A | * | 6/1988 | Fazekas | 122/13.3 |
| 5,931,200 A | * | 8/1999 | Mulvey et al. | 138/109 |
| 6,283,157 B1 | * | 9/2001 | Rocheleau | 138/109 |

* cited by examiner

Primary Examiner—A. Michael Chambers
(74) Attorney, Agent, or Firm—Michael J. Persson; Lawson & Persson, P.C.

(57) ABSTRACT

A pipe, piping system, kit, and radiant heating system that include lengths of cross-linked polyethylene pipe, which form connections between flow components. Some embodiments utilize a sheath disposed about the outside of the cross-linked polyethylene pipe to enhance rigidity.

21 Claims, 8 Drawing Sheets

PIPE, PIPING SYSTEM, RADIANT HEATING SYSTEM, AND KIT

FIELD OF THE INVENTION

The present invention relates to the field of pipes and piping systems and, in particular to pipes, piping systems and kits used to form radiant heating systems.

BACKGROUND OF THE INVENTION

Efficiently supplying heat to a building is a major concern for many. One industry solution is the use of radiant heating systems. These systems work by laying a pipe network underneath a building's floor. Heated water circulates through the pipes, evenly warming the floor. The heated floor radiates heat to the occupied space. Because the heating element in the room is the mass of floor and objects on the floor, areas closer to the floor will be warmer than those near the ceiling. The heat is retained by the mass in the lower areas of the room where the occupants are instead of allowing it to amass in the farthest heights of the room. Furthermore, the large surface area of the floor ensures horizontal heat uniformity in the room.

As previously mentioned, radiant heating systems use a pipe network to heat a floor. This network is usually achieved by covering a substantial portion of the floor's underside with flexible pipe made of high density polyethylene with an altered molecular structure that prevents the passage of oxygen through it. This type of plastic is often referred to as "PEX," short for cross-linked polyethylene. PEX is made in different grades each with a different method of oxygen barrier, if any, used during its production. PEX A is preferred in radiant heating systems because it has the most reliable method of resisting the passage of oxygen through its walls. Other pipe materials may consist of rubber, or other types of plastic that attempt to achieve the same objective of allowing heated water to pass through its length in a heating system, and have different methods of resisting the passage of oxygen through its walls. PEX piping has many advantages. It is inexpensive and does not corrode like metal. Further, it may be expanded without fracture, and then returned to its original shape. This allows it to be quickly and reliably joined together using a single pipe-expansion tool, which expands the end of the pipe to accept a barbed type fitting, which it tightly conforms to, sealing water in and air out. Further, it is easily cut and reattached using the same tool in the event that a repair must be made on the system.

A number of tools have been developed to join PEX piping to barbed connectors and these tools work reasonably well. Further, a number of joining systems, utilizing collars and other means for exerting downward pressure on the area of the pipe surrounding the barbs of the fittings, have been developed. These systems have proven to be very quick and assure reliable and leak free joints. Accordingly, it would be desirable to use this type of piping wherever connections need to be made.

Unfortunately, in the cross sections currently used, the PEX piping is substantially flexible when heated to the working temperatures of the system and may not be effectively used in horizontal or vertical runs from the boiler to the flow components and radiant manifold, due to unsightly sags and the mechanical stresses they can cause. Thus, while the use of PEX piping is ideal for the floor, traditional soldered copper and threaded steel piping systems are currently used to join the source of hot water to the various flow components and manifolds to which the PEX pipes are ultimately connected. However, these piping systems have a number of drawbacks that add to the overall cost of installing and maintaining the system.

One problem with traditional piping systems is the time required to design and install them. Typically these piping systems use flanges, threaded fittings, black steel pipe, or sweat fit copper tubing, which is extremely labor intensive to estimate, design, and install. Manufactured steel and copper piping or tubing come in straight runs and fittings for accommodating turns and curves. Each connection of a straight run with a fitting requires either a threaded or a sweat fitted solder connection and a substantial amount of installation labor is involved in making each joint.

In cases where threaded connections are to be made, the pipe must be cut to the appropriate length, and then the threads must be cut on the end of the pipe using a pipe threading die. Next, the threads must be dressed, cleaned and coated with a sealing compound, or a TEFLON®, or other synthetic resinous fluorine tape, to prevent leaks. Finally, the connector must be screwed to the pipe end with sufficient thread contact to prevent leaks.

In the case of sweat fit solder joints, the labor is comparable in that the tubing must be cut to the proper length, the end of the tubing and the fitting must be dressed and fluxed and the joint must be heated to the proper temperature with a torch to effect a satisfactory solder joint. Once joined, the solder connection must then be cleaned of any residual flux that, if left un-cleaned, may corrode the joint once exposed to moisture.

In the case of flanged connections, such as those found on, virtually, all conventional circulators, the attachment is just as labor intensive. Circulator flanges are typically elliptical in shape and do not readily accommodate a standard pipe wrench or other tightening device. In addition, when the elliptical ends of the flange have turned within the one-hundred and eighty degrees tightening arc, the wrench must be readjusted, necessitating many fatiguing and time consuming iterations to complete the task. Moreover, as the size of a pipe wrench increases, the length of the handle increases proportionally. As pipe flanges must often be attached to a circulator that is extremely close to a wall, other pipes, or even worse, a corner, the use of a long handled pipe wrench or a pry-bar and long stove bolts to attach the flange to the pipe makes this job a tiring and time consuming one. Finally, once attached to the pipe, gaskets must be installed between the flanges and bolts secured to each flange to make the connections watertight. The inventor's pipe flange and sweat flange, described and claimed in co-pending U.S. patent application Ser. No. 09/179,584, and U.S. Pat. No. 6,283, 157, respectively, ease this installation job somewhat. However, each still requires many of the same steps required for installing threaded or sweat copper connections, and each still requires the use of gaskets and bolts to secure the flanges to one another.

Another reason for the increase in installation cost is the fact that most systems are customized for the particular location in which they are to be installed. This requires that a variety of parts, having a variety of different connections, be used to piece the system together. Consequently, trained professionals who have the tools and the know-how to properly assemble such customized systems are required to install current systems.

Finally, the replacement of failed components in current systems requires that pipes be cut, rusted bolts be removed, worn gaskets be replaced, etc. This, again, increases the complexity of the work to be performed and mandates that trained professionals undertake any repair work on current systems.

Therefore, there is a need for a heated water delivery system that utilizes PEX piping between the boiler, flow components and the manifold, that is easily installed using art-recognized tools, that is substantially rigid when installed, and that may be prepackaged in kit form for further ease of installation.

SUMMARY OF THE INVENTION

The present invention is a pipe, piping system for transporting hot water from a source of hot water, a kit for forming such a piping system, and a radiant heating system, which overcome the drawbacks of current systems.

In its most basic form, the pipe includes a substantially hollow cylindrical section of cross-linked polyethylene having a first length defined by a first end and a second end, an inside surface forming an inside diameter and an outside surface forming an outside diameter. A sheath, having a second length defined by a third end and a fourth end, is disposed about at least a substantial portion of the outside surface of the section of cross-linked polyethylene. This sheath is manufactured of a substantially rigid material and has an inside surface forming an inside diameter that is preferably larger, but could be smaller if the sheathing material is flexible enough to expand around the PEX, than the outside diameter of the outside surface of the section of cross-linked polyethylene, and small enough to provide structural support for the section of cross-linked polyethylene sufficient to support the weight of the flow control components and the PEX pipe that make up the kit of parts installed between the supply and return connections on the boiler, and the radiant pipe manifold. The rigidity of the sheath will prevent the PEX from sagging when heated water flows through it, thereby eliminating stresses that may otherwise exist in non-sheathed PEX.

In the preferred embodiment, the first length of the section of cross-linked polyethylene is sufficiently longer than the second length of the sheath to allow the first end and second end to extend a distance at least 1.35 inches past the third end and fourth end of the sheath to allow the first end and second end of the section of cross-linked polyethylene to be expanded to allow a barbed fitting to be inserted therein.

The preferred section of cross-linked polyethylene has an outside diameter of 1.125 inches, an inside diameter of 0.86 inches and a first length that is 2.7 inches greater than the second length of the sheath. The preferred sheath is manufactured of 20-gauge steel having an outside diameter of 1.165 inches, an inside diameter of at least 1.125 inches, and forms a complete hollow cylinder about the section of cross-linked polyethylene pipe. The preferred pipe is designed for use with a standard PEX back-up collar having an outer diameter of 1.42 inches, an inner diameter of at least 1.125 inches and a third length of 1.10 inches. However, in other embodiments, such as those in which collars are not used, the PEX has an outside diameter of 1.42 inches, and an inside diameter of 0.86 inches, and the sheath may be sized proportionately to fit.

In some embodiments of the pipe, the sheath is an incomplete cylinder having a gap extending along the length of the sheath such that its cross section is "C" shaped. In preferred versions of these embodiments, the inside diameter of the sheath compresses about the circumference of the section of cross-linked polyethylene pipe such that the inside surface of the sheath physically engages the outer surfaces of the section of cross-linked polyethylene pipe.

In some embodiments, the entire outer surface of the sheath is colored in order to identify the pipe as being part of a particular zone. In still others, such as those for use with the kits described herein, the outer surface of the sheath includes indicia of where the pipe is to be used. This indicia may be in the form of a part number, or may include stickers or other indications of which components are to be joined by the pipe.

In its most basic form, the piping system includes a flow control valve in fluid communication with the source of hot water, a circulator in fluid communication with the flow control valve, and at least one section of cross-linked polyethylene pipe attached to, and in fluid communication with, at least one of the source of hot water, the flow control valve, and the circulator. The section of cross-linked polyethylene pipe has a cross section that allows the pipe to be substantially rigid when heated to a temperature of the hot water. In addition, the thickness of the ends of the pipe must be sufficient to allow the opening at each of two ends thereof to be expanded to accept the barbed fittings, which each have a barbed end inserted within the opening in an end of the section of pipe.

The preferred piping system also includes a tempering valve, a degassing means for removing gasses from the hot water, at least one isolator valve, and at least one temperature gauge attached to the tempering valve. In this preferred embodiment, all connections between the source of hot water, the flow control valve, circulator, tempering valve, degassing means, and isolator valve, are made utilizing the aforementioned techniques.

In some embodiments of the system each of the two barbed fittings has a mating end that is dimensioned to mate with a connector disposed upon one of the source of hot water, flow control valve, circulator, tempering valve, degassing means and/or isolator valve. In other embodiments, however, the barbed fittings are formed integral to the source of hot water, flow control valve, circulator, the tempering valve, degassing means and/or isolator valve.

Preferred embodiments of the system utilize the pipe described above, which includes a sheath disposed about an outer surface of a section of cross-linked polyethylene.

Finally, in some embodiments of the system, the flow components are all integrated into a single flow control component. Some such embodiments include the flow control valve, circulator, and tempering valve, while still others add the degassing means and isolator valve thereto. In these embodiments, the section of PEX pipe is attached to the single flow control component.

The basic kit of the present invention includes all of the components described above in connection with the system. It is envisioned that a home owner or installer will provide to the supplier the blueprints of the space in which the flow control components will be disposed, and that the supplier will assemble the kit of necessary parts, instructional drawings, and a bill of materials with which to assist the installer with the installation of the heating system of the present invention. This is advantageous, as it eliminates the need for the system to be professionally installed.

In some embodiments of the kit, all components and lengths of pipe are provided with indicia of where they are to be installed. However, other kits simply include the flow components and a plurality of sections of pipe, nipples, elbows, pipe hangers, and the like, to allow the system to be custom-built on site during installation.

Finally, the radiant heating system of the present invention includes a source of hot water and a plurality of flow control components connected in fluid communication to the source of hot water by a plurality of first pipes. The plurality of first pipes are sections of cross-linked polyethylene pipe of cross section sufficient to allow the section to remain substantially rigid when heated to a temperature of the hot water and to allow the opening at each of two ends of the section of cross-linked polyethylene pipe to be expanded to accept one of the at least two barbed fittings. A radiant tube distribution manifold is connected in fluid communication to the source of hot water and the plurality of flow control components by one of the first pipes and has a plurality of barbed distribution connectors. Similarly, a radiant tube return manifold is connected in fluid communication to the source of hot water and the plurality of flow control components by another of the first pipes, and has a plurality of barbed return connectors. Finally a plurality of second, substantially flexible, radiant pipes are connected to the barbed distribution connectors on the radiant tube distribution manifold and the barbed return connectors on the radiant tube return manifold, effectively closing the loop.

Therefore, it is an aspect of the present invention to provide a heated water delivery system that uses substantially rigid PEX pipes between the boiler and radiant manifold.

It is a further aspect of the present invention to provide a heated water delivery system that is easily installed using art-recognized tools.

It is a further aspect of the present invention to provide a heated water delivery system that is substantially rigid when installed.

It is a further aspect of the present invention to provide a heated water delivery system that may be prepackaged in kit form for further ease of installation.

It is a further aspect of the present invention to provide a heated water delivery system that uses sheath to brace PEX piping.

It is a further aspect of the present invention to provide a heated water delivery system that uses colored sheath or PEX piping to indicate pipe destinations.

It is a further aspect of the present invention to provide a heated water delivery system that has pipe couplers that do not require multiple pieces.

It is a further aspect of the present invention to provide a heated water delivery system that uses pipe couplers that can be cast from a material both inexpensive and impervious to oxidation.

It is a further aspect of the present invention to provide a heated water delivery system that uses pipe couplers that can quickly attach two severed pipe ends without using any extra pipe.

It is a further aspect of the present invention to provide a heated water delivery system that uses pipe couplers that can attach PEX pipe to threaded metal connections.

These aspects of the invention are not meant to be exclusive and other features, aspects, and advantages of the present invention will be readily apparent to those of ordinary skill in the art when read in conjunction with the following description, and accompanying drawings.

DETAILED DESCRIPTION OF THE INVENTION

Figure 1:
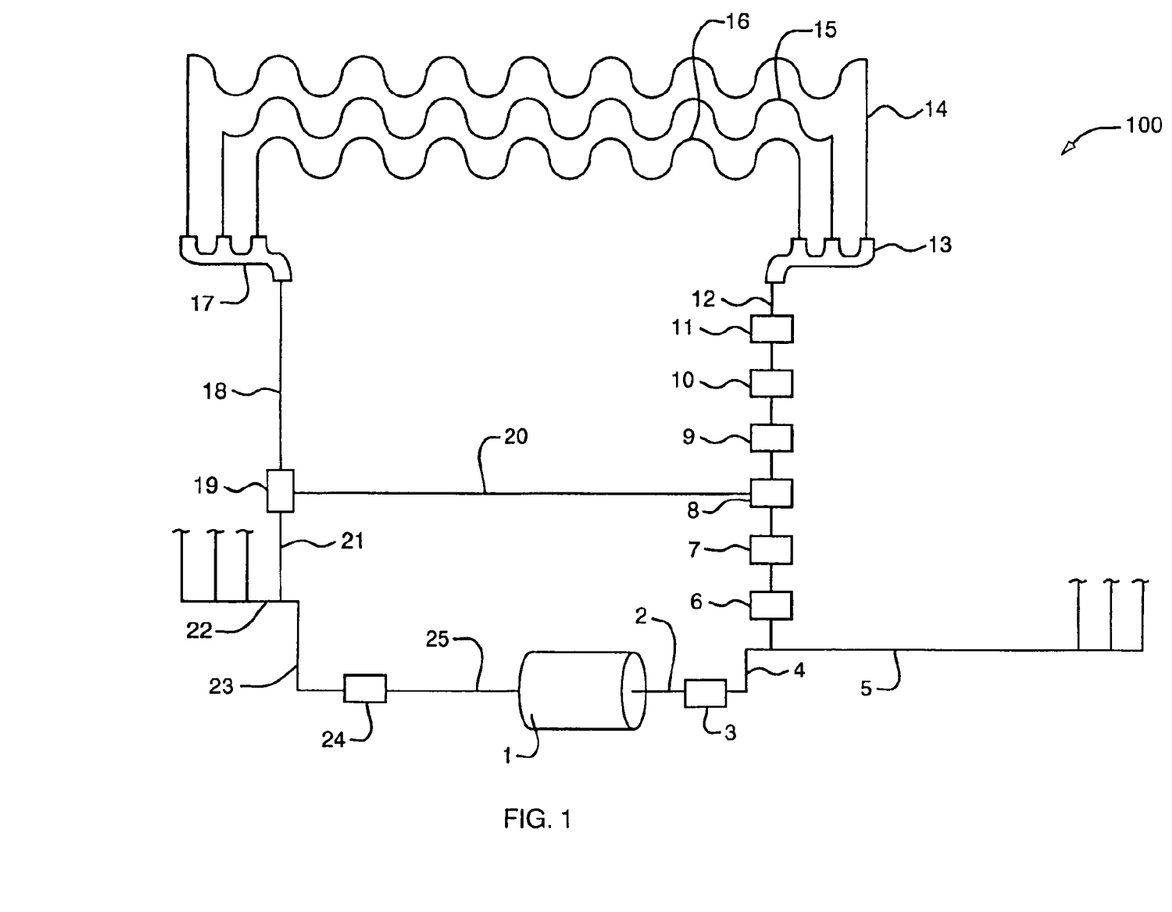
FIG. 1 is a diagrammatic view of a radiant hot water heating system.

FIG. 1 is a diagrammatic representation of a typical radiant hot water heating system 100. Boiler 1 produces a hot liquid; typically water, which is transported through the system 100 by means of circulator 10. After leaving the boiler 1 the liquid enters connection pipe 2 and flows into micro-bubble vent 3 where the liquid is de-gassed. The liquid then flows via connection pipe 4 into a zone distribution manifold 5. It is noted that a system 100 such as this will typically have two or more zones but, for clarity, only one zone is detailed in the FIG. 1.

After leaving the zone distribution manifold 5, the liquid flows in series through a first isolator valve 6, flow control valve 7, tempering unit 8, tee connection mounted temperature gauge 9, circulator pump 10, and a second isolator valve 11. After leaving the second isolator valve 11 the liquid flows through connection pipe 12 into the radiant tube distribution manifold 13.

The radiant tube distribution manifold 13 divides the liquid flow into a plurality of radiant tubes 14, 15 and 16 respectively. Three radiant tubes 14, 15 and 16 are shown purely as an example, and the number of tubes used in an actual system is dependent on the size and shape of the area to be, heated as well as the desired emission region, e.g., from the floor. The liquid passes through the radiant tubes 14, 15 and 16 and then enters the radiant tube return manifold 17 where it is reunited as a single liquid flow.

The liquid leaves radiant tube return manifold 17 via return pipe 18 and flows into tee connection 19. A portion of the liquid flow exits tee connection 19 via tempering feedback pipe 20 and flows into tempering unit 8, where it is used to reduce the temperature of the heated water from the boiler 1 to a desired temperature. The remainder of the liquid flow exiting the tee connection 19 flows into the zone return manifold 22 via connection pipe 21. The liquid flow then leaves zone return manifold 22 via connection pipe 23 and flows through purge valve 24 and connection pipe 25 into boiler 1, effectively completing the flow circuit.

Figure 2:
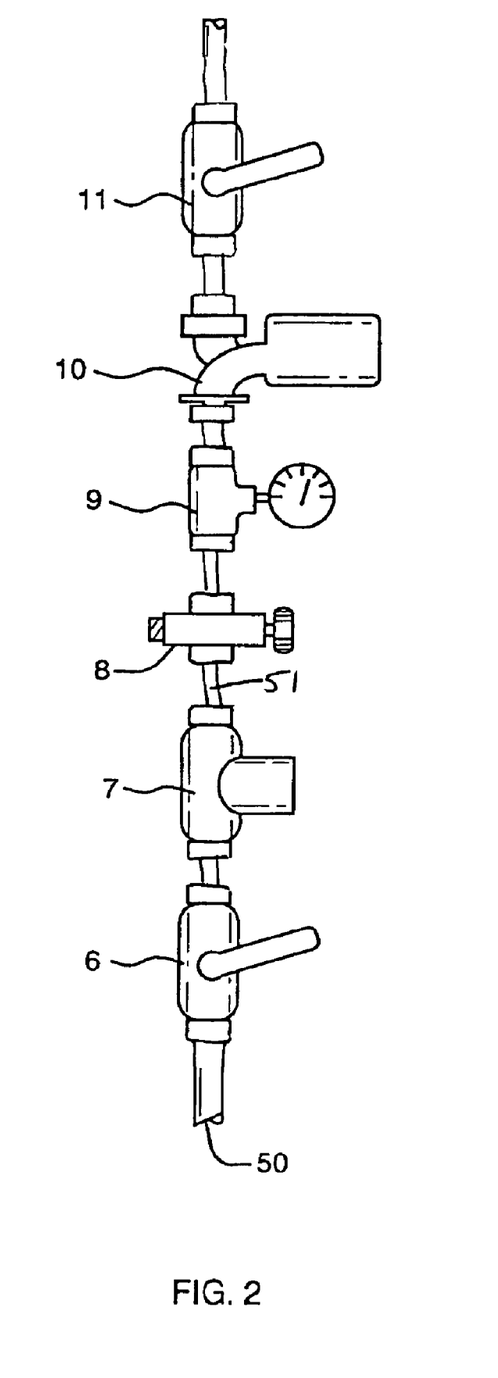
FIG. 2 is a front view of the flow components of one embodiment of the piping system of the present invention.
Figure 3:
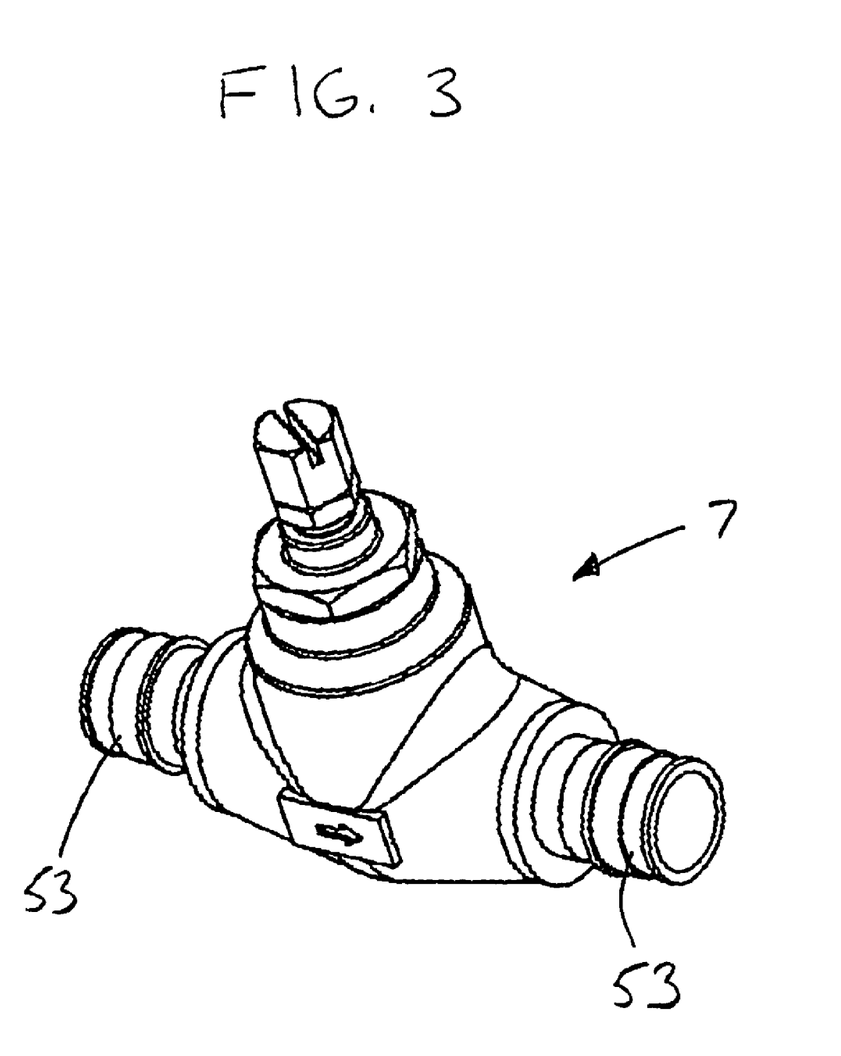
FIG. 3 is an isometric view of one embodiment of a flow control valve with integral barbed fittings at each end.

FIG. 2 shows the first isolator valve 6, flow control valve 7, tempering unit 8, tee connection mounted temperature gauge 9, circulator pump 10, and second isolator valve 11 of the radiant hot water heating system 100 of FIG. 1, and their connection together via sections of PEX piping 51. In the embodiment of FIG. 2, each component 6, 7, 8, 9, 10 & 11 has a barbed fitting 53 at each end with a barbed end 55 extending therefrom and connecting to the ends 57 of the PEX piping 51. An example of a flow control valve 7 having such integral barbed fittings 53 is shown in FIG. 3.

Figure 4:
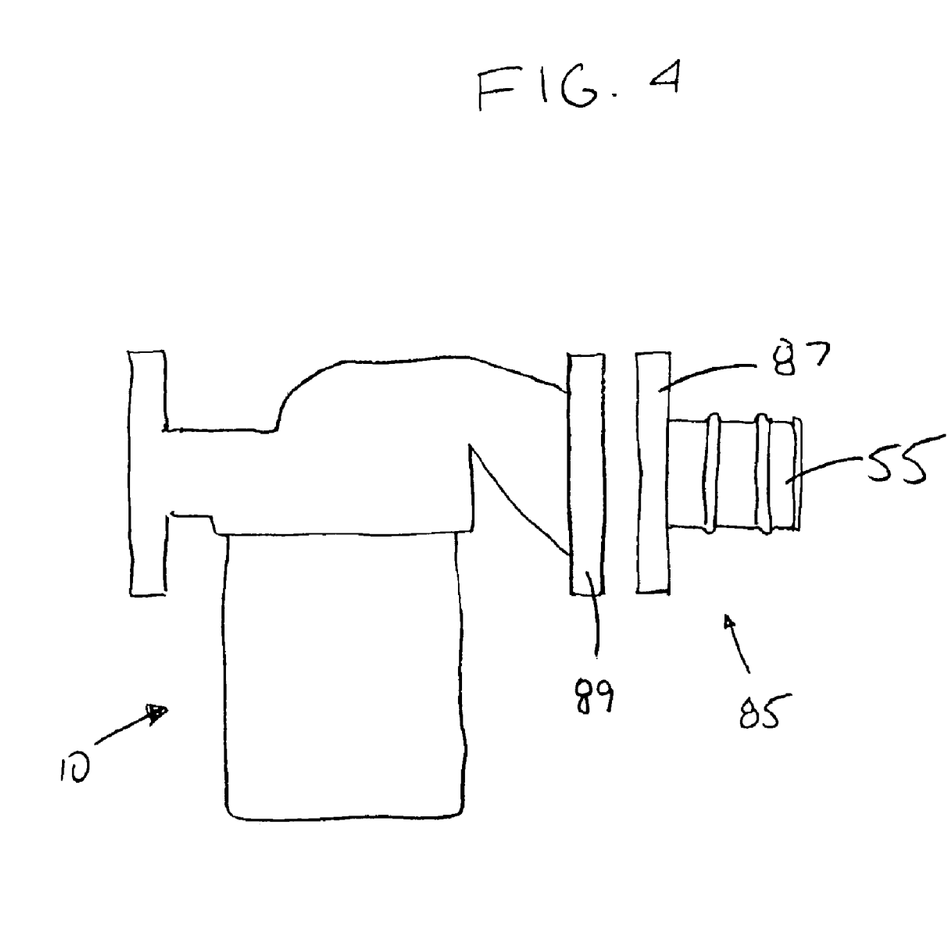
FIG. 4 is a side view of barbed fitting mating with a conventional flanged circulator.

However, in embodiments in which standard, off the shelf, components 6, 7, 8, 9, 10 & 11 are used, a plurality of separate barbed fittings with mating ends dimensioned to mate with a connector disposed upon the components 6, 7, 8, 9, 10 & 11. For example, FIG. 4 shows a barbed fitting 85 for use with the circulator 10 that has a barbed end 55 and a flanged end 87 dimensioned to mate with the flange 89 of the circulator 10. Similarly, a barbed fitting for use with the isolator valve 6 or flow control valve may have a barbed end 55 and a threaded end (not shown).

The PEX pipes 51 used between components should be different from the piping run between the radiant tube manifolds 13, 17, as these are flexible, and, as explained above, are not sufficiently rigid for use in the piping system of FIG. 2. Rather, the PEX pipes 51 used between components should have a cross section that allows them to remain substantially rigid when heated to the temperature of the hot water and to allow the opening at each of two ends of the section of cross-linked polyethylene pipe to be expanded to accept one of the at least two barbed fittings. In some embodiments, this is accomplished by instead utilizing PEX having increased wall thickness, equal in thickness to the combined thickness of the standard PEX and its collar, thereby obviating the need for a collar and external sheathing, yet still providing the necessary rigidity.

Figure 5:
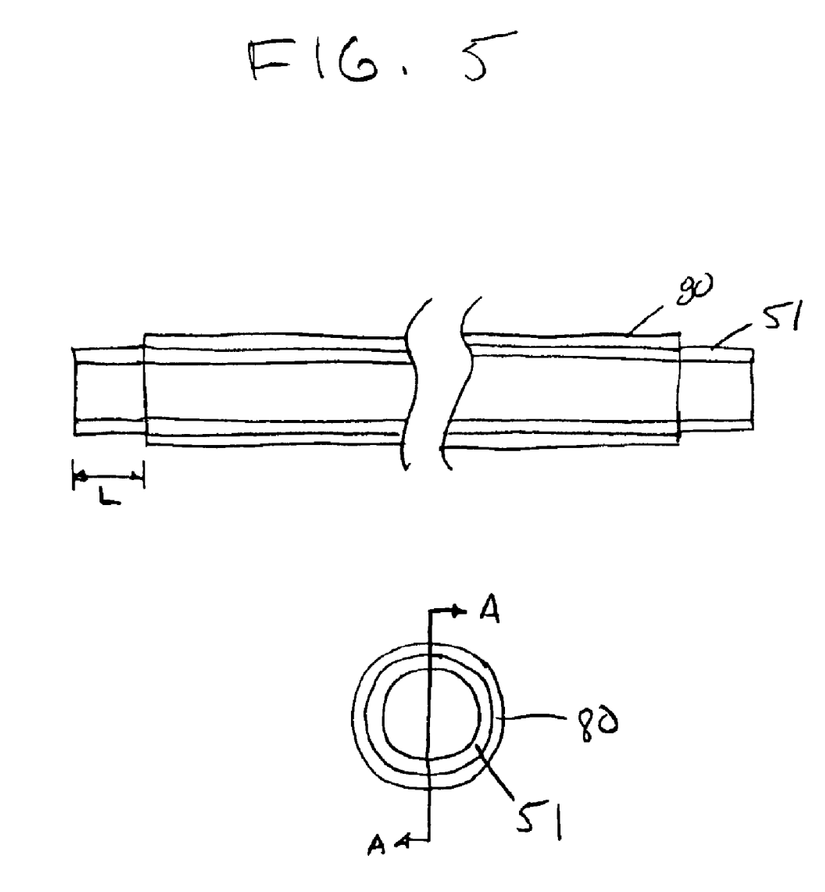
FIG. 5 is a cut away side view of the sheath and PEX piping arrangement of one embodiment of the present invention.

Referring now to FIGS. 5A & 5B, the preferred embodiments of the system utilize sheath 80 to further enhance the rigidity of the connections between components disposed over a section of PEX 82 to form PEX pipe 51. In these embodiments, the sheath 80 has an inside diameter that is slightly larger than an outside diameter of the PEX 82 to allow the pipe to be inserted therein, but be adequately supported thereby. In other embodiments the sheath inside diameter may be slightly smaller than the outside diameter of the PEX for a tighter fit. The length of the sheath 80 should be less than that of the PEX 82 such that, when inserted within the sheath, the ends of the PEX 82 will extend from the sheath 80 a distance L that is sufficient to allow the ends 83 of the pipe 51 to be expanded.

It is preferred the sheath 80 be a metallic sheath manufactured of 20-gauge steel, due to the low expense and its ability to be plated by a variety of means and colors. The inventor envisions that the use of colored sheath will be especially advantageous when used with systems having multiple zones, where sheath having different colored outside surfaces may be used to identify each zone. The inventor knows of no other such systems and, accordingly, understands this embodiment to be a significant aspect of his invention. Notwithstanding the preference of utilizing metallic sheath 80, it is recognized that other types of sheath, or other art recognized jacketing means, might be used to achieve similar results.

Figure 6:
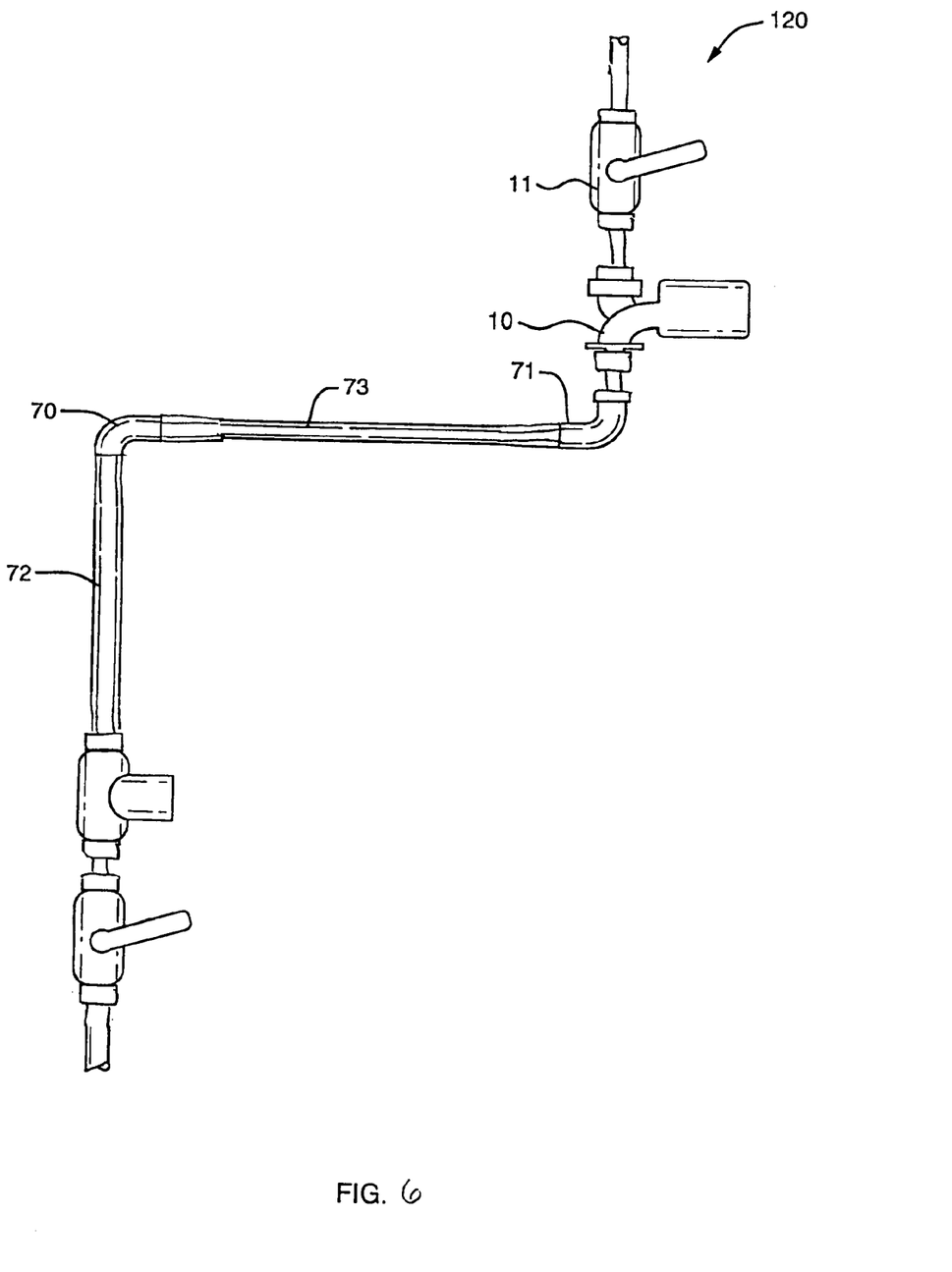
FIG. 6 is a side view of one embodiment of the piping system in which elbows are utilized to displace the components sideways.
Figure 7:
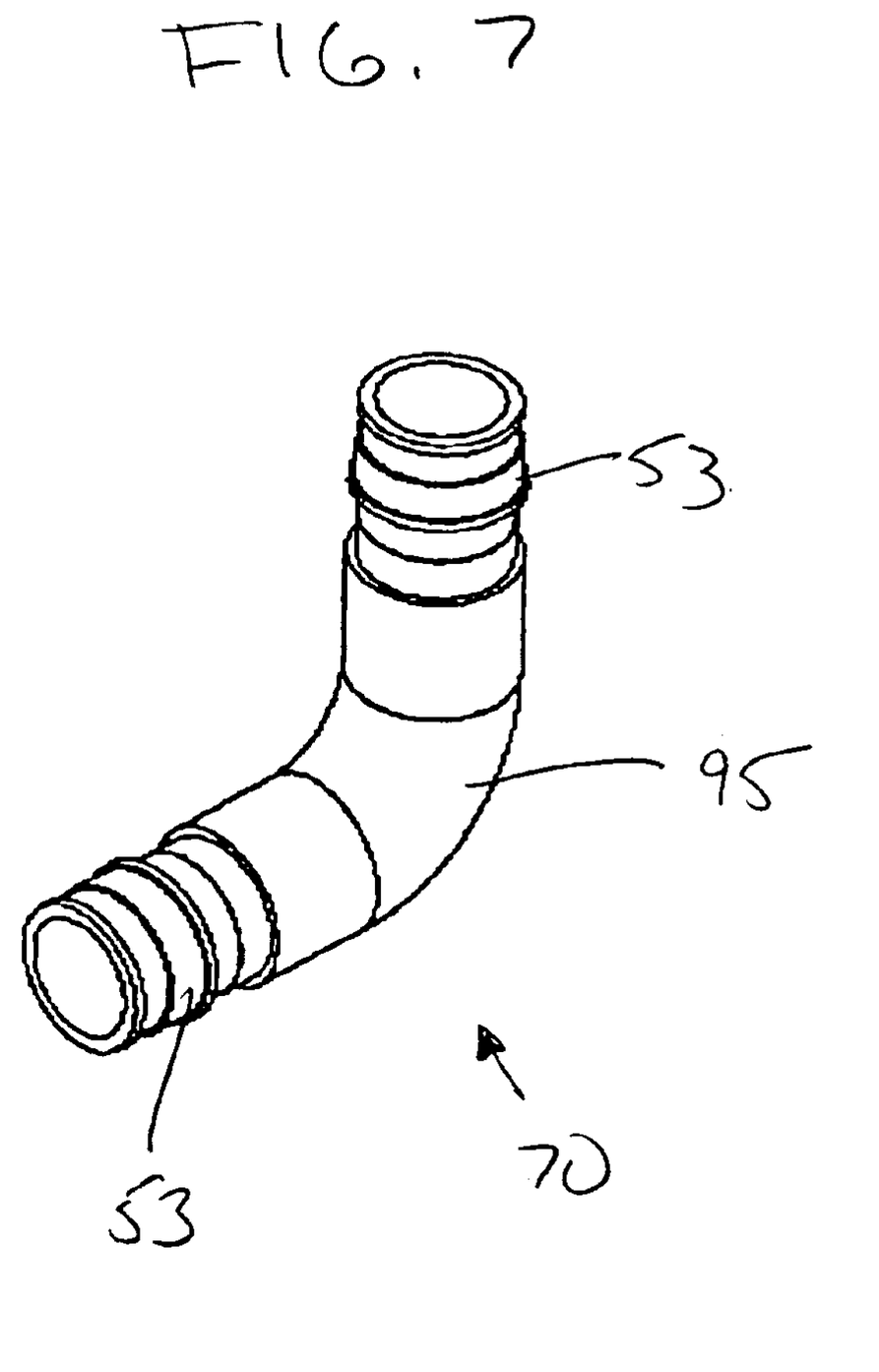
FIG. 7 is an isometric view of one embodiment of the elbow shown in FIG. 6.

FIG. 6 shows one variation of the system 100 of FIG. 1 in which the components are not disposed in line with one another. In this system 120, a plurality of offset connectors, here a pair of 90° elbows 70 and 71 and substantially rigid PEX pipes 51 are used to offset the system sideways. An example of an elbow 70 for use with the PEX pipes 51 is shown in FIG. 7. Such an elbow 70 would preferably be manufactured of metal and include a body portion 95 and a pair of barbed fittings 53 extending from each end of the body. However other embodiments utilized elbows formed of thick-walled PEX plastic and are joined to the adjacent PEX piping with barbed nipples using the aforementioned art recognized methods.

The ability to offset the system is important due to space considerations and obstacles that are found in particular installations. Therefore, although this system 120 is shown as only including a pair of 90° elbows 70 and 71, it is envisioned that other systems and kits will include a plurality of offset connectors, including tees, forty-five degree elbows, PEX to copper or PEX to threaded adaptors nipples, or the like.

It is envisioned that the components that make up the various systems will be sold in kit form, which will include all of the necessary components and offset connectors to accommodate any installation. Further, it is envisioned that, in some embodiments of the kit, an expander tool, such as those described above, will likewise be provided through rent or sale. In the case of the main system connections, i.e. connections between the, circulator, tempering valve and flow control valve, each utilize barbed fittings connected to PEX pipe. However, it is likewise recognized that there may be some parts, such as the connections from the boiler, or the return to the tempering valve in the radiant hot water system, that utilize connections other than barbed fittings and PEX pipe, and all embodiments of the present invention should not be so limited. Still further, it is recognized that all of the flow control components, pipe, elbows, and adapters may be manufactured from PEX material and joined together by barbed couplings.

Figure 8:
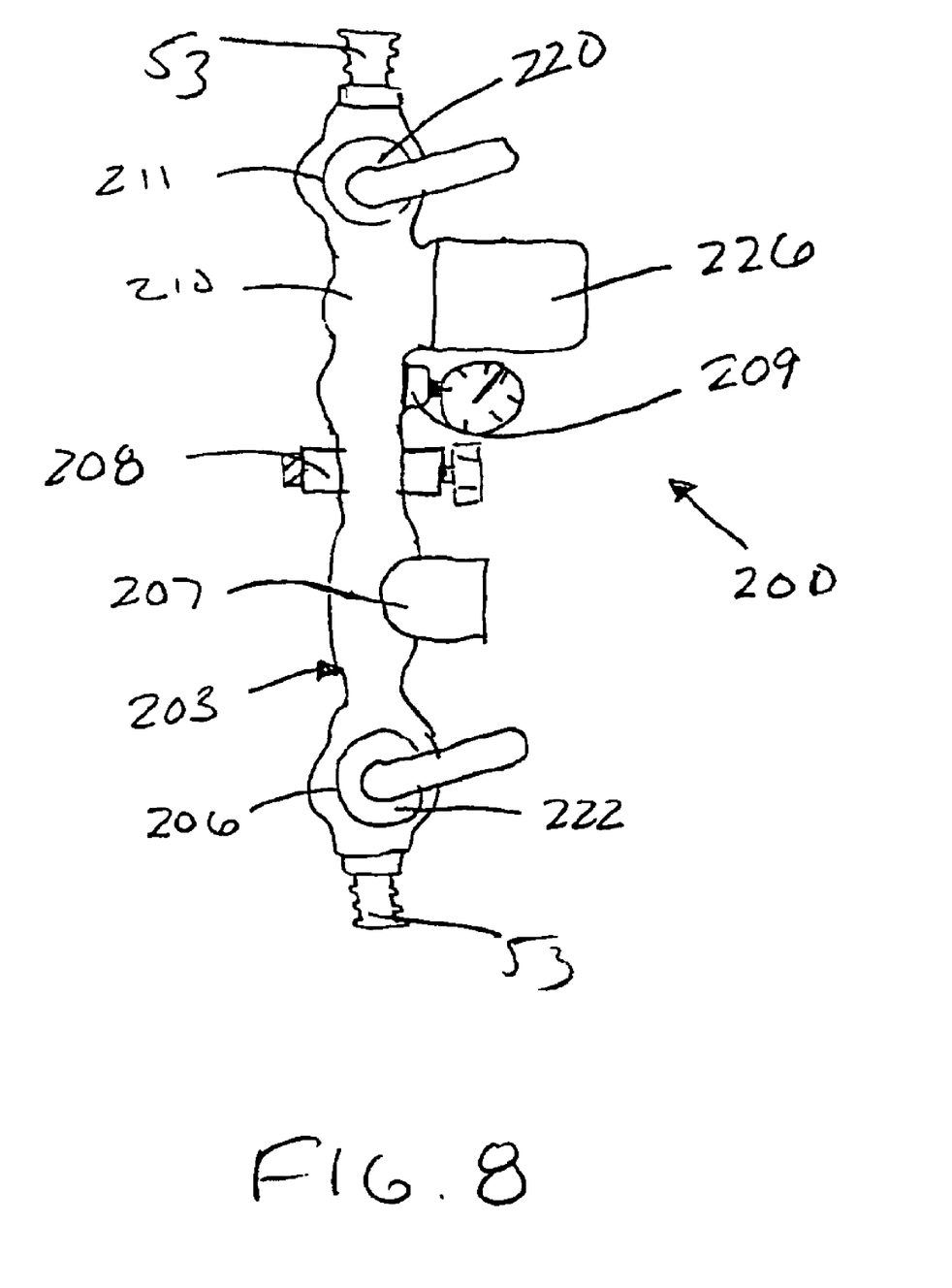
FIG. 8 is a front view of an integrated flow component of the present invention.

Referring now to FIG. 8, one embodiment of an integrated flow system are shown in which flow components are formed together into a single unit having connectors at each end. These embodiments were developed to reduce the overall number of connections in the system further expediting the assembly of the system components, and at the same time reducing the number of chances for water leaks in the system. One benefit of traditional systems is that soldered and threaded joints are extremely rugged and, therefore, will rarely ever leak. In order to attempt to emulate this kind of "permanent" seal between components, the integrated flow systems of the present invention employ a molded or cast body into which several component bodies are permanently attached together with PEX or barbed connectors attached only at the ends of the integrated system. This arrangement greatly reduces the risk of leakage, and reduces the overall complexity and time required to install the system.

The embodiment of FIG. 17 is an integrated flow component 200 that may be used to replace the multiple component arrangement of the embodiment of FIG. 2. The integrated flow component 200 of FIG. 8 includes a pair of barbed fittings 53 at each end to join the body 203 of the system 200 to upstream and downstream heating components. A first isolator valve 206 and second isolator valve 211 are preferably disposed within the body 200 of the system in order to provide isolation of the system 200 in the event that service is required on any of the components 207 208, 209, 210 of the system 200 after installation. However, it is understood that one or both of these valves 206, 211 may be eliminated, or may be separately attached to one of the connectors 251, 257 to achieve similar results. A tempering unit 208, temperature gauge 209, and circulator 210 are preferably disposed between the flow isolator valves 206, 211, with the body 203 forming the flow path between components.

In the preferred embodiment of the system, the body is molded, cast and/or machined to form a flow path having a plurality of openings disposed therein to accept the mechanical workings of each component. For example, the ends of the body 203 include threaded openings that accept the threaded innards 222, 220 of the isolator valves 206, 211, while the central portion includes an integrally formed volute to accept a replaceable cartridge 226 to form the circulator 210. Finally, as discussed above, an integrated tempering valve and temperature gauge may be utilized to replace the separate tempering valve 208 and temperature gauge 209.

It is recognized that the concept of integrating multiple components into a single system may be applied to other components disclosed herein. For example, the degassing means, such as the micro-bubble vent discussed above, could incorporate a tee on the bottom where the expansion tank would otherwise connect, so that the automatic water feed, i.e. pressure reducing valve and backflow preventer could connect where present day wisdom dictates it should be located. Of course, it is recognized that the water feed and backflow could be one "module," too. Accordingly, the integrated flow system should not be seen as limited to the flow components shown in FIG. 8

Finally, it is noted that all of the components in any of the embodiments of the systems discussed herein need only be made from one internal flow diameter; preferably one inch. One inch is preferred, as no modern residential system zone needs anything larger than this size, and having a single size reduces manufacturing, tooling, and inventory costs, etc. Further, if more heat is required, another zone could be added to the supply and return manifolds. In any of the embodiments, however, the piping and fittings between the heating source and the supply and return manifolds will be of sufficient diameter to provide the radiant tubing with enough water volume and British Thermal Units (btu) to effectively heat the structure in which it is installed.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A piping system for transporting hot water from a source of hot water, said system comprising:
    a flow control valve in fluid communication with said source of hot water;
    a circulator in fluid communication with said flow control valve;
    a tempering valve in fluid communication with said flow control valve, and said circulator;
    at least one section of cross-linked polyethylene pipe attached to, and in fluid communication with, at least one of the source of hot water, said flow control valve, said circulator, and said tempering valve; and
    at least two barbed fittings, said barbed fittings each having a barbed end inserted within an opening in an end of said at least one section of cross-linked polyethylene pipe;
    wherein said at least one section of cross-linked polyethylene pipe has a wall of a thickness sufficient to allow said section to remain substantially rigid when heated to a temperature of said hot water and to allow said opening at each of two ends of said section of cross-linked polyethylene pipe to be expanded to accept one of said at least two barbed fittings.

2. The piping system as claimed in claim 1 wherein said at least one section of cross-linked polyethylene pipe comprises a first section cross-linked polyethylene pipe attached to the source of hot water, a second section of cross-linked polyethylene pipe attached to said flow control valve, a third section of cross-linked polyethylene pipe attached to said circulator.

3. The piping system as claimed in claim 2 further comprising a tempering valve, a degassing means for removing gasses from the hot water, at least one isolator valve, and at least one temperature gauge, wherein each of said tempering valve, said degassing means, said isolator valve and said temperature gauge are in fluid communication with the source of hot water, said flow control valve, said circulator, and said tempering valve; and
    wherein said at least one section of cross-linked polyethylene pipe further comprises a fourth section of cross-linked polyethylene pipe attached to said tempering valve, a fifth section cross-linked polyethylene pipe attached to said degassing means and a sixth section cross-linked polyethylene pipe attached to said at least one isolator valve.

4. The piping system as claimed in claim 3 wherein said temperature gauge is attached to said tempering valve.

5. The piping system as claimed in claim 3 wherein each of said at least two barbed fittings further comprises a mating end dimensioned to mate with a connector disposed upon one of the source of hot water, said flow control valve, said circulator, said tempering valve, said degassing means and said isolator valve.

6. The piping system as claimed in claim 3 wherein at least one of said at least two barbed fittings is formed integral to one of the source of hot water, said flow control valve, said circulator, and said tempering valve, said degassing means and said isolator valve.

7. The piping system as claimed in claim 3 wherein said flow control valve, said circulator, and said tempering valve are integrated into a single flow control component having an inflow end and an outflow end, and wherein said at least one section of cross-linked polyethylene pipe is attached to at least one of said inflow end and said outflow end for said single flow control component.

8. The piping system as claimed in claim 1 wherein each of said at least two barbed fittings further comprises a mating end dimensioned to mate with a connector disposed upon one of the source of hot water, said flow control valve, said circulator, and said tempering valve.

9. The piping system as claimed in claim 1 wherein at least one of said at least two barbed fittings is formed integral to one of the source of hot water, said flow control valve, said circulator, and said tempering valve.

10. The piping system as claimed in claim 1 wherein said cross-linked polyethylene pipe comprises a substantially hollow cylindrical section of cross-linked polyethylene having a first length defined by a first end and a second end, an inside surface forming an inside diameter and an outside surface forming an outside diameter; and a sheath disposed about at least a substantial portion of said outside surface of said section of cross-linked polyethylene;
    wherein said sheath is manufactured of a substantially rigid material, and having a second length defined by a third end and a fourth end, and an inside surface forming an inside diameter large enough to fit about said outside surface of said cross-linked polyethylene and small enough to provide structural support for said section of cross-linked polyethylene sufficient to support the weight of said flow control valve, said circulator, and said tempering valve; and
    wherein said first length of the section of cross-linked polyethylene is sufficiently longer than said second length of said sheath to allow said first end and second end to extend a distance past said third end and fourth end of said sheath to allow said first end and second end of said section of cross-linked polyethylene to be expanded to allow a barbed fitting to be inserted therein.

11. The piping system as claimed in claim 9 further comprising a second flow control valve in fluid communication with said source of hot water, a second circulator in fluid communication with said flow control valve, a second tempering valve in fluid communication with said flow control valve, and said circulator, and at least one second section of cross-linked polyethylene pipe attached to, and in fluid communication with, at least one of the source of hot water, said second flow control valve, said second circulator, and said second tempering valve;
   wherein said flow control valve, said circulator, and said tempering valve comprise a first zone, and wherein said second flow control valve, said second circulator, and said second tempering valve comprise a second zone; and
   wherein a first color is disposed upon said outside surface of said sheath disposed about said at least one section of cross-linked polyethylene pipe of said first zone, and wherein a second color is disposed upon said outside surface of said sheath disposed about said at least one second section of cross-linked polyethylene pipe of said second zone.

12. The piping system as claimed in claim 1, wherein at least one of said flow control valve, said circulator, and said tempering valve are manufactured of cross linked polyethylene and comprise and inflow end and an outflow end that are dimensioned to be expanded to accept one of said at least two barbed fittings.

13. A kit of parts for forming a piping system for transporting hot water from a source of hot water, said system comprising:
   a flow control valve dimensioned for disposal in fluid communication with the source of hot water;
   a circulator dimensioned for disposal in fluid communication with said flow control valve;
   at least one section of cross-linked polyethylene pipe dimensioned for attachment in fluid communication with at least one of the source of hot water, said flow control valve, said circulator, and said tempering valve; and
   at least two barbed fittings, each of said barbed fittings having a barbed end dimensioned for insertion within an opening in an end of said at least one section of cross linked polyethylene pipe;
   wherein said at least one section of cross-linked polyethylene pipe is of sufficient cross-section to allow said section to remain substantially rigid when heated to a temperature of said hot water and to allow said opening at each of two ends of said section to be expanded to accept one of said at least two barbed fittings.

14. The kit as claimed in claim 13 further comprising a tempering valve, a degassing means and at least one isolator valve for disposal in fluid communication with the source of hot water, said flow control valve, and said circulator.

15. The kit as claimed in claim 14 wherein each of said at least two barbed fittings further comprises a mating end dimensioned to mate with a connector disposed upon one of the source of hot water, said flow control valve, said circulator, said tempering valve, said degassing means and said isolator valve.

16. The kit as claimed in claim 14 wherein said a flow control valve, said circulator, and said tempering valve are integrated into a single flow control component, and wherein said at least one section of cross-linked polyethylene pipe is dimensioned for attachment to said single flow control component.

17. The kit as claimed in claim 13 wherein at least one of said at least two barbed fittings is formed integral to one of the source of hot water, said flow control valve, said circulator, and said tempering valve.

18. The kit as claimed in claim 13 wherein said cross-linked polyethylene pipe comprises a substantially hollow cylindrical section of cross-linked polyethylene having a first length defined by a first end and a second end, an inside surface forming an inside diameter and an outside surface forming an outside diameter, and a sheath disposed about at least a substantial portion of said outside surface of said section of cross-linked polyethylene;
   wherein said sheath is manufactured of a substantially rigid material, and comprises a second length defined by a third end and a fourth end, and an inside surface forming an inside diameter large enough to fit about said outside surface of said cross-linked polyethylene and small enough to provide structural support for said section of cross-linked polyethylene sufficient to support the weight of said flow control valve, said circulator, and said tempering valve; and
   wherein said first length of the section of cross-linked polyethylene is sufficiently longer than said second length of said sheath to allow said first end and second end to extend a distance past said third end and fourth end of said sheath to allow said first end and second end of said section of cross-linked polyethylene to be expanded to allow a barbed fitting to be inserted therein.

19. The kit as claimed in claim 17 further comprising a second flow control valve in fluid communication with said source of hot water, a second circulator in fluid communication with said flow control valve, a second tempering valve in fluid communication with said flow control valve, and said circulator, and at least one second section of cross-linked polyethylene pipe attached to, and in fluid communication with, at least one of the source of hot water, said second flow control valve, said second circulator, and said second tempering valve;
   wherein said flow control valve, said circulator, and said tempering valve comprise a first zone, and wherein said second flow control valve, said second circulator, and said second tempering valve comprise a second zone; and
   wherein a first color is disposed upon said outside surface of said sheath disposed about said at least one section of cross-linked polyethylene pipe of said first zone, and wherein a second color is disposed upon said outside surface of said sheath disposed about said at least one second section of cross-linked polyethylene pipe of said second zone.

20. The kit as claimed in claim 13 further comprising an expander tool for expanding said ends of said at least one section of cross-linked polyethylene pipe.

21. The kit as claimed in claim 13, wherein at least one of said flow control valve, said circulator, and said tempering valve are manufactured of cross linked polyethylene and comprise an inflow end and an outflow; wherein at least one of said inflow end and said outflow end are each dimensioned to be expanded to accept one of said at least two barbed fittings.

* * * * *